United States Patent
Williams

(10) Patent No.: US 9,121,509 B2
(45) Date of Patent: Sep. 1, 2015

(54) VALVE THAT IS NORMALLY CLOSED IN THE FREE STATE

(75) Inventor: David Lloyd Williams, Newport Beach, CA (US)

(73) Assignee: Novartis AG, Basel (CH)

( * ) Notice: Subject to any disclaimer, the term of this patent is extended or adjusted under 35 U.S.C. 154(b) by 1105 days.

(21) Appl. No.: 11/860,606

(22) Filed: Sep. 25, 2007

(65) Prior Publication Data
US 2008/0077077 A1     Mar. 27, 2008

Related U.S. Application Data

(60) Provisional application No. 60/847,159, filed on Sep. 26, 2006.

(51) Int. Cl.
*A61M 5/14* (2006.01)
*F16K 1/12* (2006.01)

(52) U.S. Cl.
CPC ........................................ *F16K 1/12* (2013.01)

(58) Field of Classification Search
CPC ... F16K 1/12; A61M 1/0058; A61M 2205/12; A61M 5/14
USPC ............... 417/477.2; 604/131, 246, 247, 249, 604/256, 289, 30, 33
See application file for complete search history.

(56) References Cited

U.S. PATENT DOCUMENTS

| | | | |
|---|---|---|---|
| 2,917,002 A | | 12/1959 | Anthony |
| 4,201,525 A | | 5/1980 | Brown et al. |
| 4,299,221 A | * | 11/1981 | Phillips et al. .................. 604/30 |
| 4,317,436 A | * | 3/1982 | Barnhart et al. ........... 123/188.6 |
| 4,392,794 A | | 7/1983 | Foxcroft |

(Continued)

FOREIGN PATENT DOCUMENTS

| | | |
|---|---|---|
| CN | 1622902 | 6/2005 |
| EP | 0712640 | 5/1996 |

(Continued)

OTHER PUBLICATIONS

European Search Report for Application No. 07117291.0, Publication No. EP1906067, Published 01/1812008, 2 pages.

(Continued)

*Primary Examiner* — Kami A Bosworth
*Assistant Examiner* — Imani Hayman
(74) *Attorney, Agent, or Firm* — Darien Reddick

(57) ABSTRACT

A valve system comprising a valve design in which the valve is normally closed is disclosed. The normally closed valve can comprise a circular valve seal face formed by the underside of a rim of an elastomeric valve boss and a circular valve seat, which is formed by the rim of a through-hole molded into, for example, a plastic cassette, such that the valve seal face, the valve seat, and the through hole are concentric. The valve boss can be a hollow "mushroom" shaped valve boss, or a conical-shaped valve boss. If no force is applied to the inside surface of the valve boss, no fluid can pass through the valve as the valve seal face rests against the valve seat as a result of the steady free-state load created by the stretch of the valve boss over the slightly longer through hole. When a force is applied to the inside surface of the valve boss, the valve seal face is displaced from the valve seat, allowing fluid between the valve seal face and valve seat and then to pass between the valve boss and the inside surface of the through hole.

9 Claims, 4 Drawing Sheets

(56) References Cited

U.S. PATENT DOCUMENTS

| | | | |
|---|---|---|---|
| 4,429,856 A * | 2/1984 | Jackson | 251/149.1 |
| 4,497,468 A * | 2/1985 | Hubbard et al. | 251/117 |
| 4,515,588 A * | 5/1985 | Amendolia | 604/118 |
| 4,703,775 A * | 11/1987 | Pastrone | 137/625.3 |
| 4,713,051 A * | 12/1987 | Steppe et al. | 604/30 |
| 4,757,814 A * | 7/1988 | Wang et al. | 606/174 |
| 5,083,743 A * | 1/1992 | Gordon et al. | 251/81 |
| 5,088,515 A * | 2/1992 | Kamen | 137/15.17 |
| 5,395,350 A * | 3/1995 | Summers | 604/249 |
| 6,210,361 B1 * | 4/2001 | Kamen et al. | 604/82 |
| 6,293,926 B1 | 9/2001 | Sorensen et al. | |
| 6,312,409 B1 * | 11/2001 | Gross | 604/131 |
| 6,511,454 B1 * | 1/2003 | Nakao et al. | 604/31 |
| 6,554,023 B2 * | 4/2003 | Danby et al. | 137/510 |
| 6,599,271 B1 * | 7/2003 | Easley | 604/119 |
| 6,684,903 B2 * | 2/2004 | Williamson et al. | 137/494 |
| 6,962,488 B2 | 11/2005 | Davis et al. | |
| 8,500,421 B2 | 8/2013 | Domash et al. | |
| 2002/0002351 A1 | 1/2002 | Cote, Sr. et al. | |
| 2003/0135152 A1 | 7/2003 | Kollar et al. | |
| 2003/0190244 A1 | 10/2003 | Davis et al. | |
| 2005/0017213 A1 * | 1/2005 | Swan | 251/356 |
| 2005/0082508 A1 | 4/2005 | Dziob et al. | |
| 2005/0230292 A1 | 10/2005 | Beden et al. | |

FOREIGN PATENT DOCUMENTS

| | | |
|---|---|---|
| EP | 1662142 A1 | 5/2006 |
| FR | 2765267 | 12/1998 |
| JP | 8-206213 | 8/1996 |
| JP | 2005-299873 | 10/2005 |
| RU | 2181454 | 4/2002 |
| WO | 0142696 | 6/2001 |
| WO | 2005/089832 | 9/2005 |

OTHER PUBLICATIONS

European Search Report for Application No. 07104077.8, Publication No. EP1839689, Published 07/0312007, 2 pages.

Umbrella Check Valves, Vernay Laboratories, Jul. 26, 2014; 6 pages; http://www.vernay.com/products/umbrella.htm.

\* cited by examiner

VALVE THAT IS NORMALLY CLOSED IN THE FREE STATE

CROSS-REFERENCE TO RELATED APPLICATIONS

This application claims priority under 35 U.S.C. §119 to U.S. Provisional Patent Application No. 60/847,159, filed Sep. 26, 2006, the entire contents of which are incorporated herein by reference.

TECHNICAL FIELD OF THE INVENTION

The present invention relates to surgical systems and methods. More particularly, the present invention relates to valve design employed in surgical cassettes used in an ophthalmic surgical system.

BACKGROUND OF THE INVENTION

The human eye can suffer a number of maladies causing mild deterioration to complete loss of vision. While contact lenses and eyeglasses can compensate for some ailments, ophthalmic surgery is required for others. Generally, ophthalmic surgery is classified into posterior segment procedures, such as vitreoretinal surgery, and anterior segment procedures, such as cataract surgery. More recently, combined anterior and posterior segment procedures have been developed.

The surgical instrumentation used for ophthalmic surgery can be specialized for anterior segment procedures or posterior segment procedures or support both. In any case, the surgical instrumentation often requires the use of associated consumables such as surgical cassettes, fluid bags, tubing, handpiece tips and other consumables.

A surgical cassette can provide a variety of functions depending on the procedure and surgical instrumentation. For example, surgical cassettes for cataract surgeries (e.g., phacoemulsification procedures) help manage irrigation and aspiration flows into and out of a surgical site. Surgical cassettes can also provide support for fluid bags, a manifold for directing vacuum/pressure to surgical instrumentation, and other functionality.

During a surgical procedure, such as a cataract surgery, fluid flow is controlled by valves within the surgical cassette. However, current cassette designs utilize valves that are classified as "normally open," meaning that the valves are open unless they are actively engaged in order to close them. These normally open valves allow fluid ingress into the cassette's (and therefore the surgical system's) aspiration path during cassette installation and removal. Further, normally open valves can result in the dribbling of liquids from the cassette ports when removed from the receiver, which limits the overall cleanliness of a surgical procedure. Further still, for some applications, normally open valves do not "fail safe" in a loss of power situation, resulting in potentially unwanted fluid flow when power is lost.

Therefore, a need exists for a cassette valve design that can control the flow of liquids within the cassette while reducing or eliminating the problems of prior art cassette valve designs and that can provide increased functionality, reliability, cleanliness and safety.

SUMMARY OF THE INVENTION

Embodiments of the present invention provide a valve design in which the valve is normally closed. The normally closed valve can comprise a circular valve seal face formed by the underside of a rim of an elastomeric valve boss and a circular valve seat, which is formed by the rim of a through-hole molded into, for example, a plastic cassette, such that the valve seal face, the valve seat, and the through hole are concentric. The valve boss can be a hollow "mushroom" shaped valve boss, or a conical-shaped valve boss. If no force is applied to the inside surface of the valve boss, no fluid can pass through the valve as the valve seal face rests against the valve seat as a result of the steady free-state load created by the stretch of the valve boss over the slightly longer through hole. When a force is applied to the inside surface of the valve boss, the valve seal face is displaced from the valve seat, allowing fluid between the valve seal face and valve seat and then to pass between the valve boss and the inside surface of the through hole.

In a preferred embodiment, the valve design can be used in a fluidics cassette adapted for use in ophthalmic surgery.

Embodiments of the present invention provide an advantage by eliminating unwanted fluid ingress into a cassette's aspiration path during cassette installation, during cassette setup, during the procedure, and upon cassette removal.

Embodiments of the present invention provide another advantage by preventing dribbling from the cassette aspiration ports after removal, thereby improving the overall cleanliness of a surgical procedure.

Embodiments of the present invention provide another advantage by providing active control to fail safe during a power loss condition.

BRIEF DESCRIPTION OF THE DRAWINGS

A more complete understanding of the present invention and the advantages thereof may be acquired by referring to the following description, taken in conjunction with the accompanying drawings in which like reference numbers indicate like features and wherein.

DETAILED DESCRIPTION OF THE INVENTION

Preferred embodiments of the invention are illustrated in the FIGURES, like numerals being used to refer to like and corresponding parts of the various drawings.

Embodiments of the present invention include a valve that is normally closed, meaning under static steady-state conditions no fluid can pass through the valve. According to one embodiment, the valve seal face can be the rim on an underside of an elastomeric hollow mushroom or conical shaped valve boss and the valve seat can be the rim of a through-hole designed such that no fluid can pass through the valve unless a force is applied to the inner surface of the valve boss. According to a preferred embodiment, the valve would be employed in a fluidics cassette adapted for use in an ophthalmic surgical console.

Figure 1:
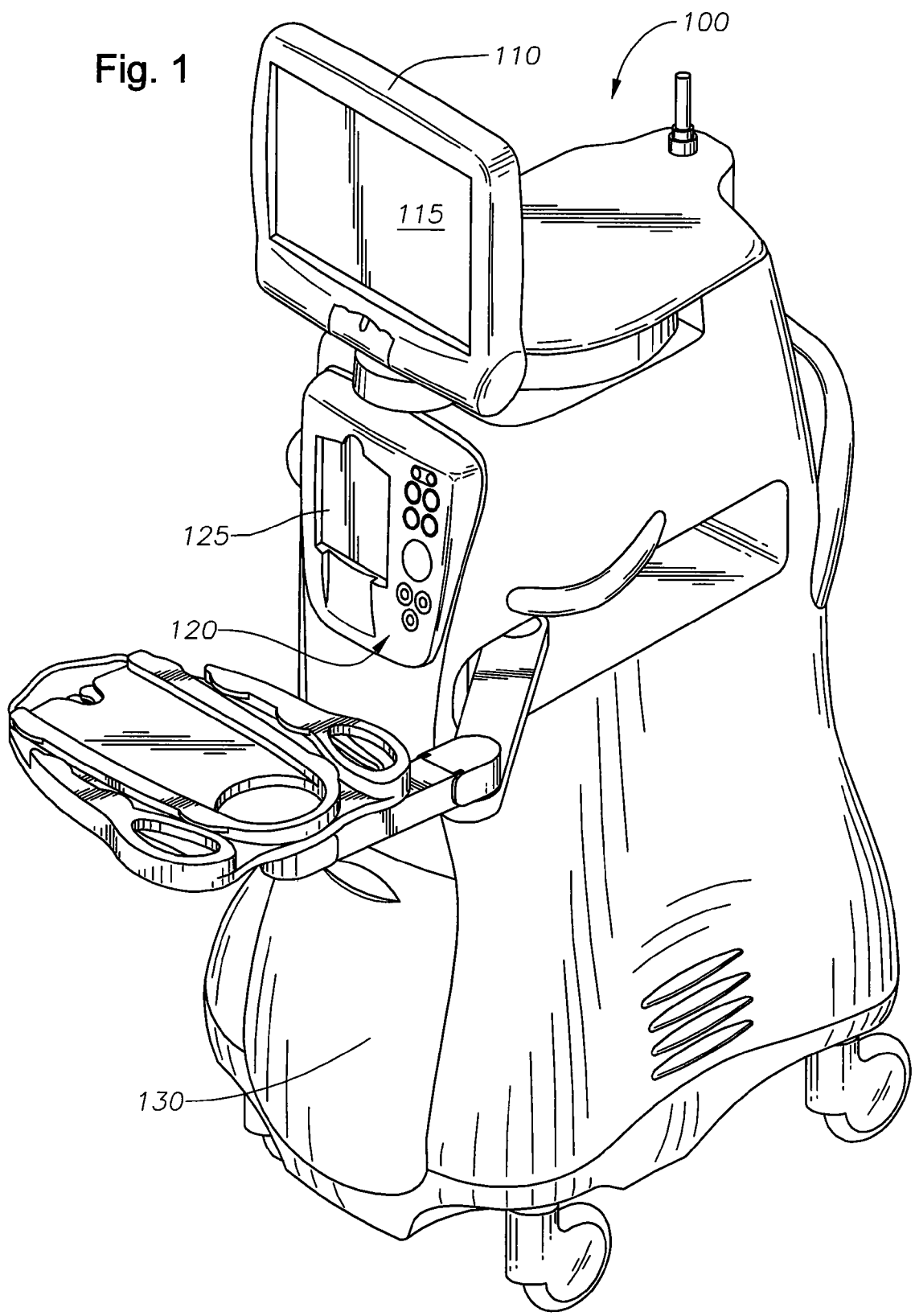
FIG. 1 is a diagrammatic representation of one embodiment of a surgical console.

FIG. 1 is a diagrammatic representation of one embodiment of an ophthalmic surgical console 100. Surgical console 100 can include a swivel monitor 110 that has touch screen 115. Swivel monitor 110 can be positioned in a variety of orientations for whomever needs to see touch screen 115. Swivel monitor 110 can swing from side to side, as well as rotate and tilt. Touch screen 115 provides a graphical user interface ("GUI") that allows a user to interact with console 100.

Surgical console 100 also includes a connection panel 120 used to connect various tools and consumables to surgical console 100. Connection panel 120 can include, for example, a coagulation connector, balanced salt solution receiver, connectors for various hand pieces and a fluid management system ("FMS") or cassette receiver 125. Surgical console 100 can also include a variety of user friendly features, such as a foot pedal control (e.g., stored behind panel 130) and other features. In operation, a cassette (not shown) can be placed in cassette receiver 125 and held in place with clamps to minimize movement during use.

Figure 2:
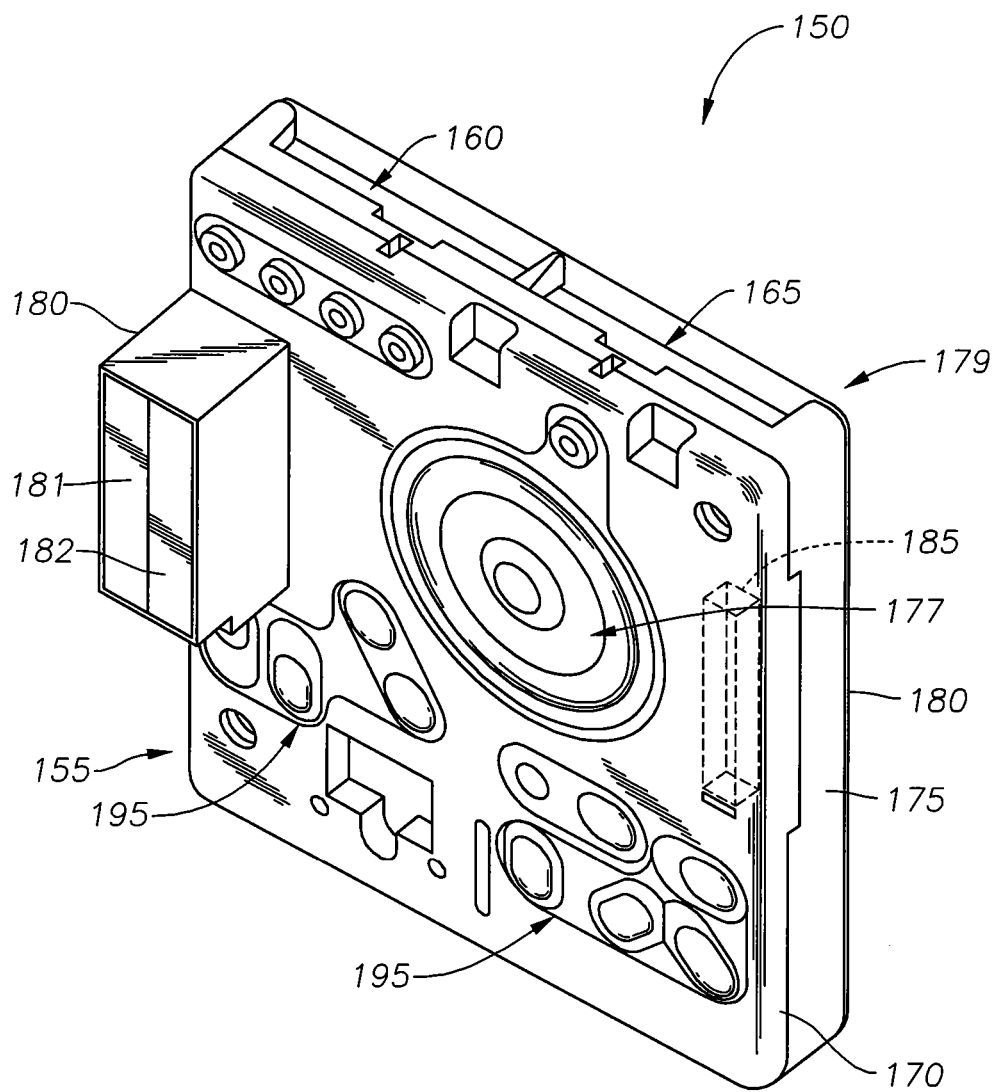
FIG. 2 is a diagrammatic representation of one embodiment of a surgical cassette.

FIG. 2 is a diagrammatic representation of one embodiment of a surgical cassette 150. Cassette 150 can provide a closed system fluidic device that can be discarded following a surgical procedure. Cassette 150 can include a cassette body 155 and portions that interface with the clamp (e.g., indicated generally at clamping zones 160 and 165) projecting from the cassette body 155. Cassette 150 can be formed of ABS plastic or other suitable material. In the embodiment shown, cassette 150 is formed from three primary sections: an inner or surgical console interface section 170 that faces the surgical console when cassette 150 is inserted into surgical console 100, a middle section 175 and a cover plate 179. The various sections of cassette 150 can be coupled together via a press fit, interlocking tabs, chemical bonding, thermal bonding, mechanical fasteners or other attachment mechanism known in the art. In other embodiments, cassette 150 can be formed of a single piece or multiple pieces.

Surgical console interface section 170 can face the console during use and provide an interface for fluid flow channels (e.g., flow channel 177 for the peristaltic pump provided by an elastomeric pump membrane), valves (e.g., infusion/aspiration valves indicated generally at 195), and other features to manage fluid flow. Cassette 150 can also attach to a fluid bag (not shown) to collect fluids during a procedure. Pins located on a cassette receiver (shown in FIG. 3 at 135) manipulate elastomeric valves 195 such that fluid flow within the cassette can be controlled without fluid from the cassette contacting the surgical console or cassette receiver.

Surgical cassette 150, according to various embodiments of the present invention, includes chambers to hold fluids for aspiration and infusion. For example, chamber housing 180 can include two infusion chambers 181/182. A third chamber 185 can be internal to cassette 150 on the opposite side of cassette 150 from chamber housing 180 (e.g., at the side of cassette 150 indicated by 190). According to one embodiment, the level of fluid in the chambers can be determined by various means that will be known to those having skill in the art.

Figure 3:
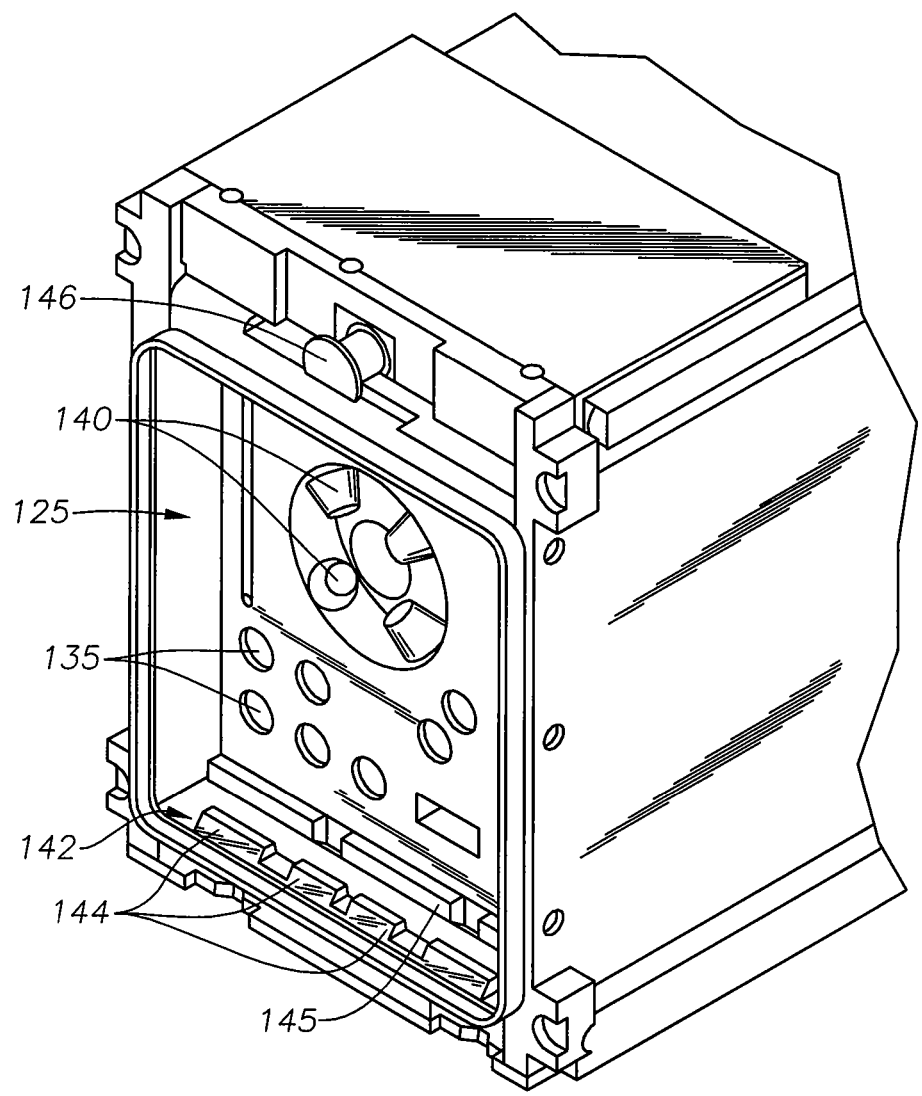
FIG. 3 is a diagrammatic representation of one embodiment of a cassette receiver.

FIG. 3 is a diagrammatic representation of one embodiment of cassette receiver 125 without a cassette. Cassette receiver 125 can have various configurations of pins (indicated generally at 135) designed to impinge upon the elastomeric valve membranes of the surgical cassette 150 as a means to control fluid flow within the cassette. Cassette receiver 125 can further include an opening to allow peristaltic pump rollers 140 to contact the surgical cassette 150 during operation. One embodiment of a peristaltic pump and complimentary cassette is described in U.S. Pat. No. 6,293,926 to Sorensen, which is hereby fully incorporated by reference herein.

The surgical cassette 150, in the embodiment of FIG. 3, is held in place by a clamp having a bottom rail 142 and a top rail (not shown). Each rail can have clamping fingers (e.g., clamp finger 144) that contact the cassette in corresponding clamping zones. A release button 146 is pressed to initiate release of the cassette from the clamp. Depending on the surgical console 100, the cassette release process can include several steps, including venting of pressure or fluids, disengaging the clamps or other steps. The configuration of FIG. 3 is provided by way of example. The form factor of cassette receiver 125, placement and number of pins and other features of cassette receiver 125 can depend on the surgical console 100, the surgical procedure being performed or on other factors.

Figure 4:
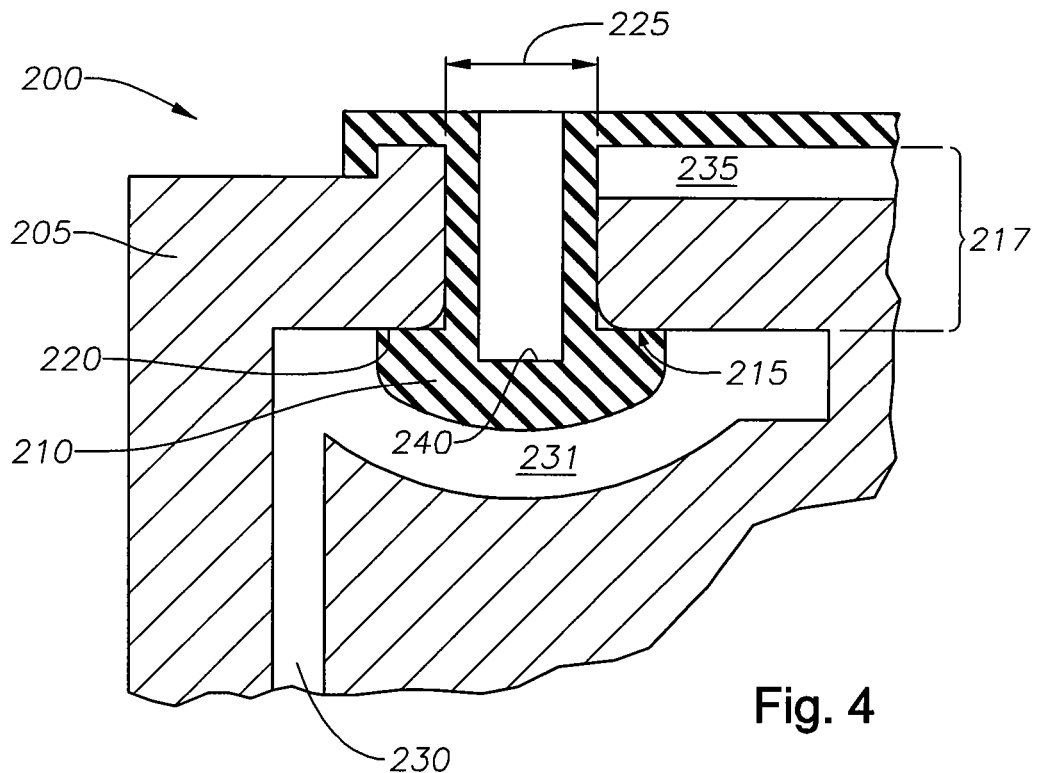
FIG. 4 is a cross-section view of the present invention when no force is applied to the inside surface of the hollow mushroom-shaped valve boss.

FIG. 4 is a cross-section view of one embodiment of a valve 200 of the present invention in a steady state condition. A hollow mushroom shaped valve boss 210 is located within through-hole 225 of housing 205 (which, in a preferred embodiment, would be the plastic body of a surgical cassette 150). Circular valve seat 220 is located at the rim of through hole 225, and circular valve seal 215 is located at the rim of mushroom shaped valve boss 210. Valve 200 can be configured such that valve seat 220, valve seal face 215, and through-hole 225 are concentric. The length 217 of through-hole 225 is slightly longer than the unstretched length of 210; thus, when no force is applied to inner surface 240 of valve boss 210, contact is maintained between valve seal face 215 and valve seat 220 due to the steady free-state load created by the stretch of the valve boss 210 over the slightly longer length of the through-holed 225. As a result, fluid entering chamber 231 from channel 230 will not be able to pass between valve seal face 215 and valve seat 220 and move into channel 235. As a result of this configuration, valve 200, in steady state condition, is closed and prohibits fluid flow.

Figure 5:
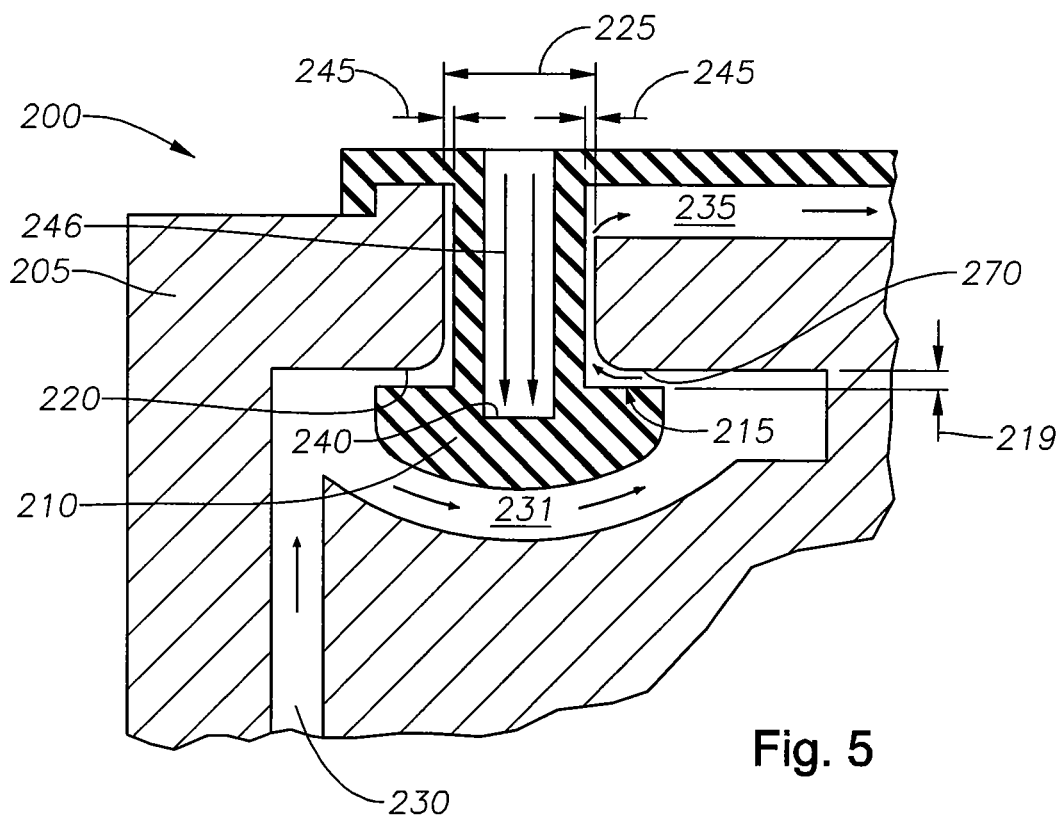
FIG. 5 is a cross-section view of the present invention when force is applied to the inside surface of the hollow mushroom-shaped valve boss.

FIG. 5 is a cross-section view of valve 200 with a force, indicated by arrows 246, being applied to the inside surface 240 of valve boss 210. Force 246 has the effect of displacing the mushroom shaped head of valve boss 210 a distance 219 such that valve seal face 215 and valve seat 220 are no longer in contact. The stretching of the hollow elastomeric cylindrical portion of valve boss 210 also causes the outside diameter of valve boss 210 to contract, which results in a radial gap 245 between the outside wall of cylindrical valve boss 210 and an inner wall 270 of through-hole 225. Gaps 219 and 245 allow fluid entering chamber 231 from channel 230 to pass through the valve and into channel 235.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed in the following claims.

The invention claimed is:

1. A valve system comprising:
    a housing containing a fluid inlet channel and a fluid outlet channel, wherein the fluid inlet channel and the fluid outlet channel are connected by a through-hole; and
    an elastomeric valve boss having a hollow elastomeric cylindrical portion forming an interior cavity and a head portion, the cavity including an opening at a first end of the elastomeric cylindrical portion opposite the head portion, the elastomeric cylindrical portion extending concentrically through the through-hole such that, under static conditions, a rim on an underside of the head portion of the valve boss forms a valve seal face that maintains contact with a rim of the through-hole preventing fluid flow through the through-hole, the rim of the through-hole forming a valve seat, the valve boss having an open position wherein the elastomeric cylindrical portion is axially stretched by application of a force to an interior surface of the cavity to displace the valve seal face from the valve seat to form a gap therebetween resulting in a fluid connection through the through-hole between the fluid inlet channel and the fluid outlet channel.

2. The valve system of claim 1, wherein the head portion is a hollow mushroom-shaped head portion having an interior surface.

3. The valve system of claim 2, wherein the fluid connection further comprises a radial gap formed between an outer surface of the elastomeric cylindrical portion that is contracted due to the application of the force to the interior surface of the cavity and an outer surface of the through-hole adjacent thereto.

4. The valve system of claim 1, wherein the valve boss is a conical-shaped valve boss, and wherein an outer diameter of the conical-shaped valve boss forms a sealing surface against an edge of the through-hole.

5. The valve system of claim 1, wherein the housing is a surgical cassette.

6. The valve system claim 5, wherein the surgical cassette is adapted for one time use followed by disposal.

7. The valve system of claim 5, wherein the surgical cassette is adapted for insertion into a cassette receiver located on an ophthalmic surgical console.

8. The system of claim 7, wherein the cassette receiver on the ophthalmic surgical console comprises means of applying a force to the interior surface of the cavity.

9. The valve system of claim 1, wherein a wall of the cylindrical portion defining the cavity extends along an entire length of the cavity.

\* \* \* \* \*